Figure 1:
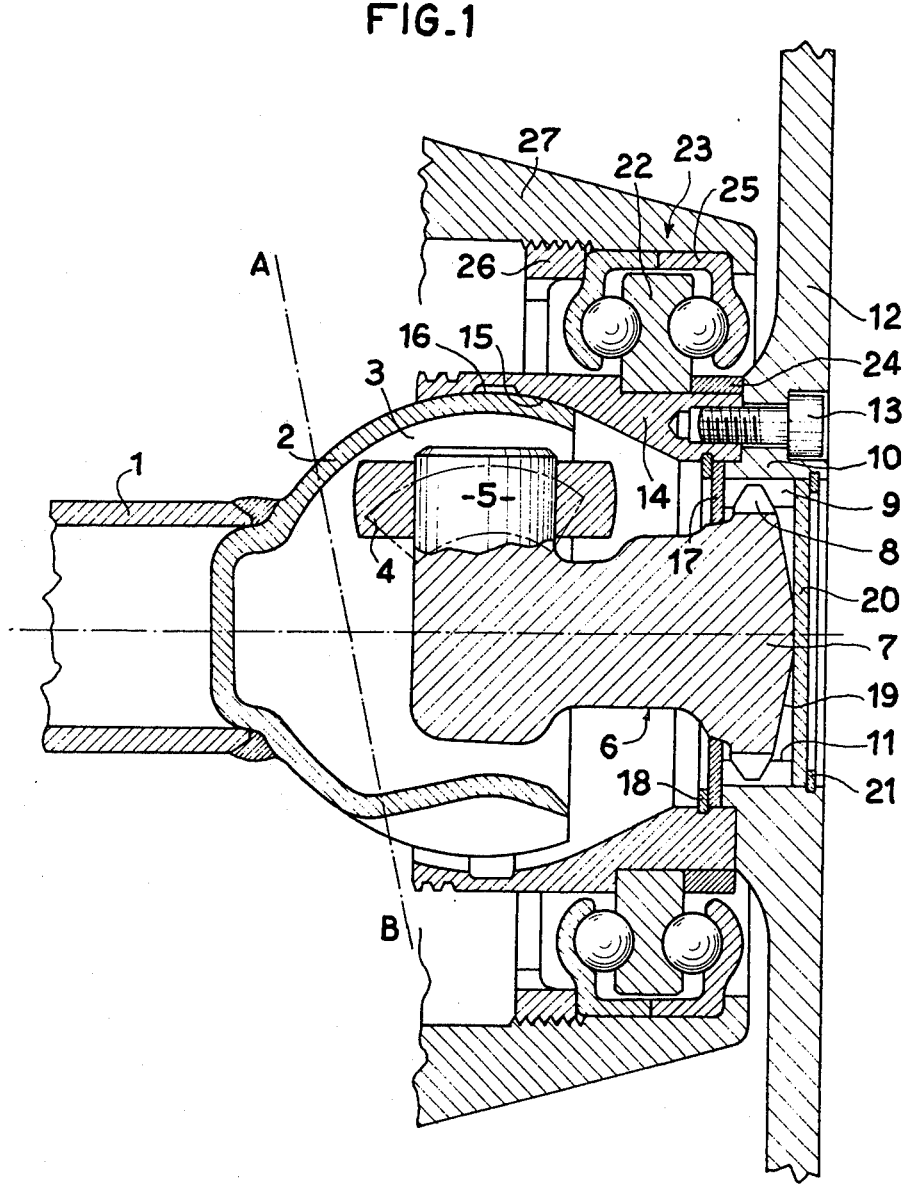

United States Patent [19]

Guimbretiere

[11] 4,275,799
[45] Jun. 30, 1981

[54] WHEEL HUB AND HOMOKINETIC JOINT ASSEMBLY

[75] Inventor: Pierre L. Guimbretiere, Neauphle le Chateau, France

[73] Assignee: Spicer Glaenzer, Poissy, France

[21] Appl. No.: 33,678

[22] Filed: Apr. 26, 1979

[30] Foreign Application Priority Data

Apr. 28, 1978 [FR] France ................... 78 12766
Apr. 3, 1979 [FR] France ................... 79 08301

[51] Int. Cl.³ ............................................. B60K 17/30
[52] U.S. Cl. ........................................ 180/255; 64/21; 180/258
[58] Field of Search ............... 280/255, 254, 256, 257, 280/258, 263; 64/21, 22, 8

[56] References Cited

U.S. PATENT DOCUMENTS

| 1,676,322 | 7/1928 | Chilton | 180/258 |
| 1,981,173 | 11/1934 | Herrington | 180/257 |
| 4,178,778 | 12/1979 | Orain | 64/21 |

FOREIGN PATENT DOCUMENTS 456925 3/1928 Fed. Rep. of Germany.
584952 9/1933 Fed. Rep. of Germany.

Primary Examiner—John A. Pekar
Attorney, Agent, or Firm—Schuyler, Banner, Birch, McKie & Beckett

[57] ABSTRACT

The assembly comprises a hub and a homokinetic joint comprising a first tripod element connected to the hub and defining three trunnions on which are mounted three part-spherical rollers and a second element connected to a transmission shaft and defining three raceways in which the rollers carried by the tripod element are received. The hub defines a cavity in which is received at least partly this tripod element which constitutes a distinct part and is connected to the wall of this cavity by an auxiliary homokinetic coupling. The latter is capable of operating at a given angle which is added to the normal pivoting or break angle of the joint and consequently increases the maximum break angle of the joint.

17 Claims, 9 Drawing Figures

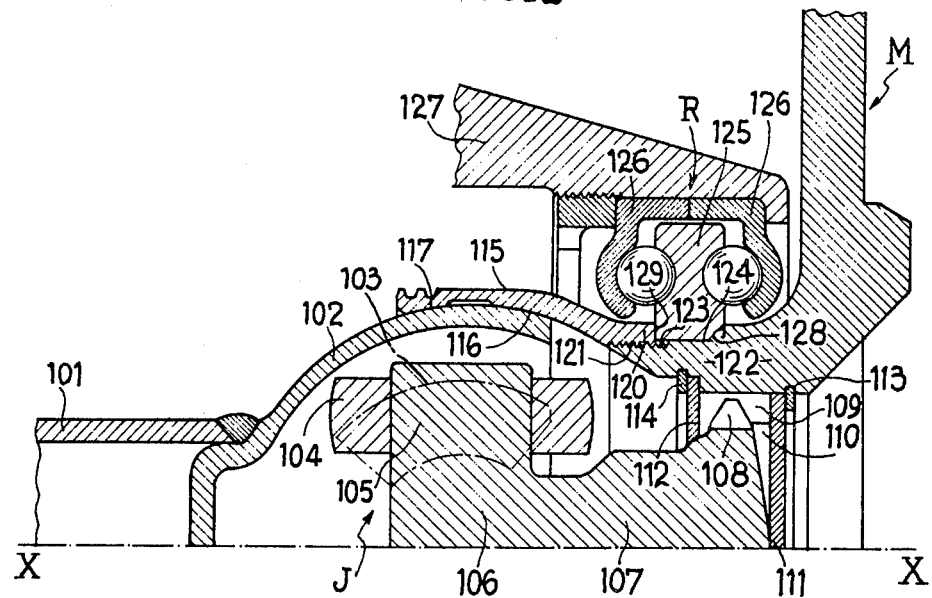
FIG_2
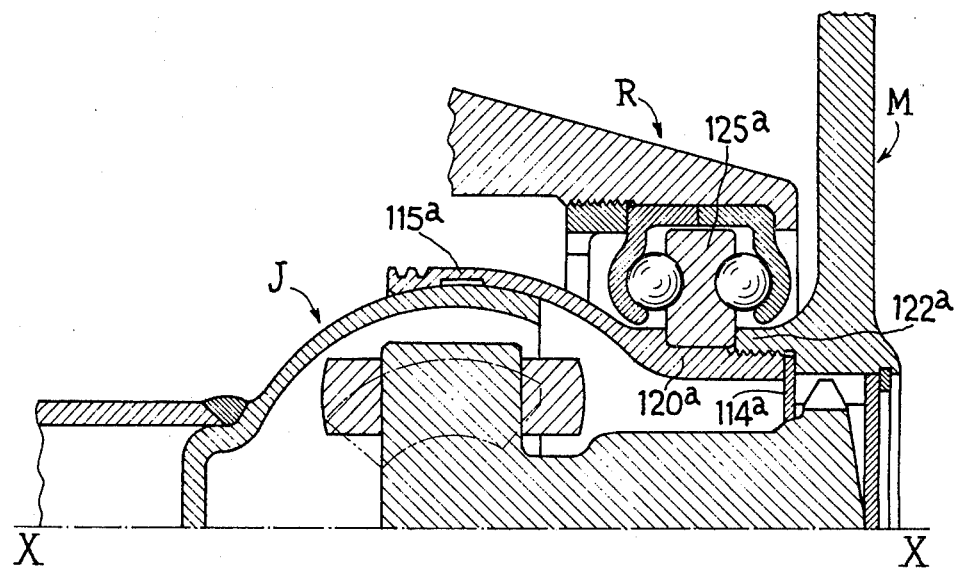
FIG_3

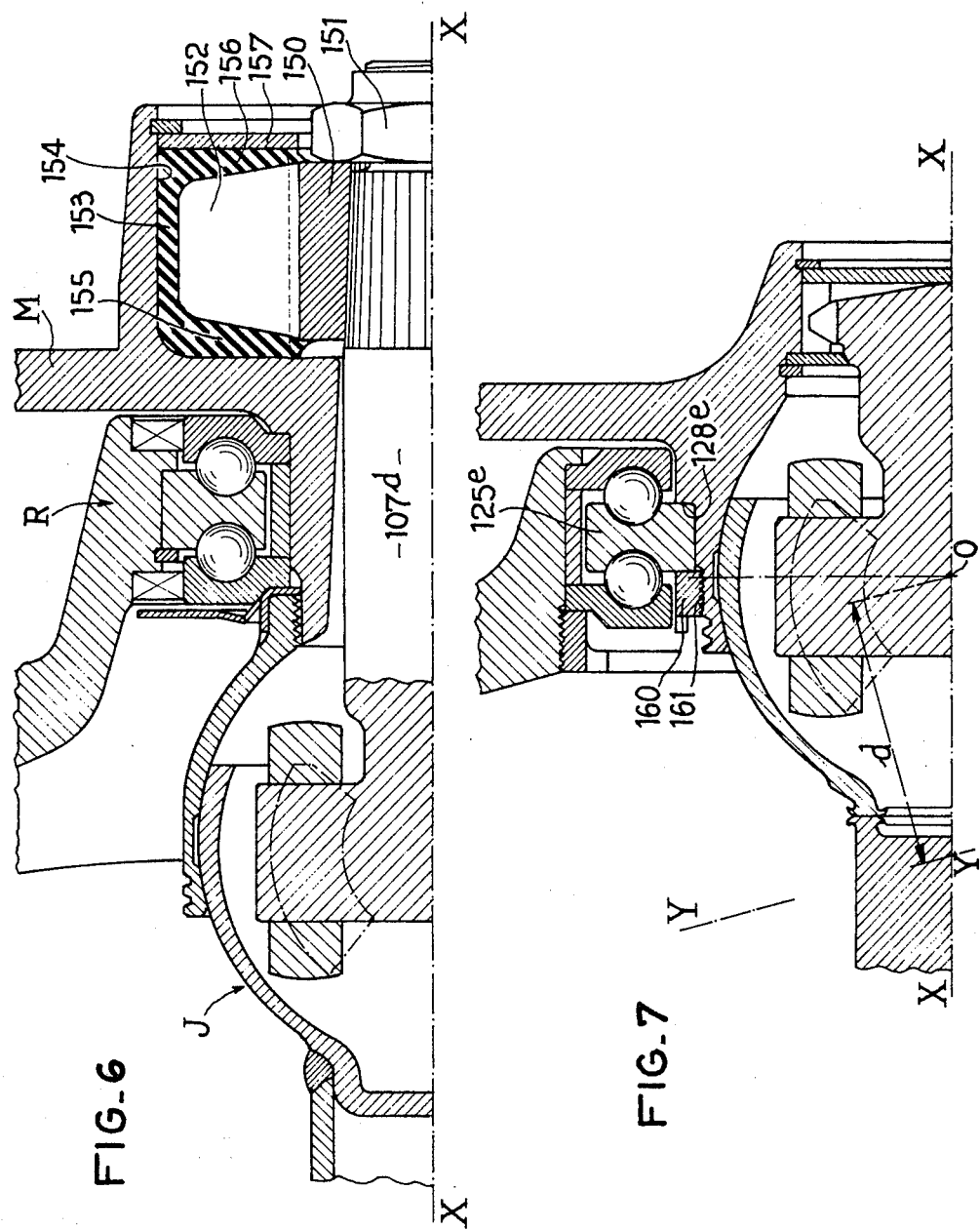

WHEEL HUB AND HOMOKINETIC JOINT ASSEMBLY

DESCRIPTION

The present invention relates to an assembly comprising a wheel hub and a homokinetic joint for a vehicle.

In a case of driving and steering wheels, or a suspended rear axle, the transmission between the output of the differential and the driving wheels is ensured by two homokinetic joints which are interconnected by a transmission shaft, the outer joint near to the hub usually being connected to the latter by a shaft section which is splined and held axially in position by a nut. The hub is moreover mounted on an element of the structure of the vehicle by a rolling bearing.

In such an arrangement, a critical problem resides in the obtainment of a radial and axial overall size which is as small as possible. The object of this invention is to provide an assembly whose overall size is smaller than in the prior art and whose assembly and disassembly are relatively easy.

According to the invention, there is provided a wheel hub assembly comprising a homokinetic joint having a first element or tripod connected to the hub and defining three trunnions on which are mounted three part-spherical rollers, and a second element connected to a transmission shaft and defining three raceways having a part-circular cross-sectional shape and in which the rollers carried by the tripod are received, the hub defining a cavity in which is at least partly received the tripod which constitutes a distinct part and is connected to the wall of the cavity by an auxiliary homokinetic coupling capable of operating at a given angle which is added to the normal pivot angle of the joint and consequently increases the maximum pivot angle of the joint.

According to other features:

the wheel hub is rigid with a member forming a case and defining a concave part-spherical bearing surface which cooperates with a complementary part-spherical bearing surface carried by the other element of the joint; the assembly between the hub, the member forming a case and the element adjacent a wheel rolling bearing being achieved by means of a single connection by screwthreading disposed concentrically with the axis of the wheel hub;

the hub and/or the member forming a case comprises a lateral extension which is centered on the axis of the hub and defines an axial bearing surface and at least one radial shoulder which cooperates with said element of the rolling bearing, the assembly of the hub-case-element assembly of the rolling bearing being achieved by means of a single screwthreaded connection between the hub and the member forming a case;

the axial bearing surface is defined by the lateral extension of the hub, the radial shoulders for blocking the element of the rolling bearing being defined respectively on the hub and on the member forming a case, the screwthreaded connection being achieved directly between the lateral extension of the hub and said member;

the lateral extension is provided mainly on the member forming a case;

the hub and the member forming a case are in one piece;

the screwthreaded connection is achieved by means of a nut which cooperates with a screwthread provided on the hub or on the member forming a case.

The invention will be described in more detail hereinafter with reference to the accompanying drawings in which FIGS. 1 to 9 are sectional views of various embodiments of a hub assembly according to the invention.

FIG. 1 shows a driving shaft 1 rigid with a bowl member 2 in which are defined three raceways 3 having a part circular cross-section shape and in which are received three rollers 4 which are rotatively and slidably mounted on the trunnions 5 of an element 6 in the form of a tripod. The tripod element is rigid with a short shaft section 7 which carries at its free end teeth 8 which cooperate with inner teeth 9 formed in the wall 10 of a cavity 11 defined in a wheel hub 12. The teeth 8 and the teeth 9 constitute an auxiliary homokinetic coupling.

The wheel hub 12 is fixed, for example by screws 13, to a member 14 forming a case and defining a concave part-spherical bearing surface 15 which cooperates with a complementary convex part-spherical bearing surface 16 defined by the bowl element 2. The tripod element is maintained axially relative to the hub by a thrust washer 17 which is held in position by a resilient ring 18 clipped into a groove of the member 14. The complementary surfaces of the washer 17 and tripod element preferably have a part-spherical shape. Moreover, the end of the shaft section 7 also has a roughly part-spherical bearing surface 19 which bears against a side wall 20 which is held in position by a resilient ring 21 fixed to the hub.

The inner ring 22 of the rolling bearing 23 is blocked between the hub 12 and the member 14 with interposition of a spacer member 24. The outer rings 25 of this rolling bearing are rendered rigid with a hub supporting element 27 of the structure of the vehicle by means of a screwthreaded collar 26. The illustrated rolling bearing is of the type comprising two rows of balls located on each side of a centre ring, but it will be understood that any other type of rolling bearing could also be suitable.

With the arrangement just described, the torque is transmitted from the transmission shaft 1 through the homokinetic joint bowl member 2 and the toothed coupling 8, 9 between the tripod element 6 and the hub 12, this coupling thus performing the function usually performed by splines disposed between a driven shaft rigid with the tripod element and splines provided on the wheel hub.

This arrangement is consequently particularly compact. The drawing shows an axis A,B which designates the pivot axis of the wheel and it can be seen that the homokinetic joint can thus be placed substantially outside of this axis which, subject to a very slight extension of the sliding provided by the joint placed at the output of the differential at the opposite end of the shaft 1, permits an increase in the pivoting or steering angle of the wheel without, however, requiring of the joint a maximum break or pivot angle exceeding the normal values.

FIG. 2 shows a hub assembly comprising mainly a homokinetic joint J, a wheel hub M and a rolling bearing R. The joint comprises a driving shaft 101 rigid with a bowl element 102 in which are defined in the known manner three part-toric raceways 103 in which are received three rollers 104 which are rotatively and slidably mounted on the trunnions 105 of an element 106 in the form of a tripod. This tripod element is rigid with a short shaft section 107 which carries at its free end teeth 108 cooperating with inner teeth 109 formed in the wall of a cavity 110 defined in the wheel hub M. The teeth 108 and the teeth 109 constitute an auxiliary homokinetic coupling.

As before, this assembly is completed by a side wall 111 and a washer 112 which are respectively maintained by resilient rings 113, 114 and which retain and guide the tripod element. There is also provided a member 115 forming both a retaining means and defining a concave part-spherical bearing surface 116 which cooperates with a complementary convex part-spherical bearing surface 117 defined by the bowl element 102.

According to an important feature, this member 115 terminates at the end thereof adjacent to the hub by a roughly cylindrical portion 120 which is provided with an internal screwthread 121. The hub also has a lateral extension 122 which extends toward the joint and comprises an outer screwthread 123 which cooperates with the screwthread of the member forming a case. The lateral extension of the hub defines a cylindrical bearing surface 124 for the inner ring 125 of the wheel rolling bearing, the outer rings 126 of the bearing being blocked in the known manner relative to a structural element 127 of the vehicle. The inner ring 125 is axially blocked between two radial shoulders 128, 129 respectively defined on the axial extension of the hub and on the end face of the member 115.

With such an arrangement, the assembly and disassembly are particularly simple since the assembly of the hub and the adjacent part of the homokinetic joint and the inner ring of the rolling bearing is achieved by a single screwthreaded connection whose diameter is relatively large and which is centered on the axis X—X of the hub. Further, this screwthreaded connection is located in a region of the axial extension of the hub in which practically no force passes since the torque is transmitted to the hub directly through the coupling 108, 109. The tilt torque is also transmitted in a particularly satisfactory manner.

The arrangement shown in FIG. 3 is very similar to that of FIG. 2, a difference residing in the fact that the lateral extension 122a of the hub is shorter, whereas it is the member 115a which is extended by a cylindrical tubular portion 120a of the greater length. The screwthreaded connection is thus shifted toward the hub while it conserves the advantages mentioned with respect to the foregoing embodiment. The radial shoulders which lock the inner ring of the rolling bearing are provided in the hub and the member 115a, the latter moreover retaining the washer 114a so that the number of component parts may be still further reduced.

Figure 4:
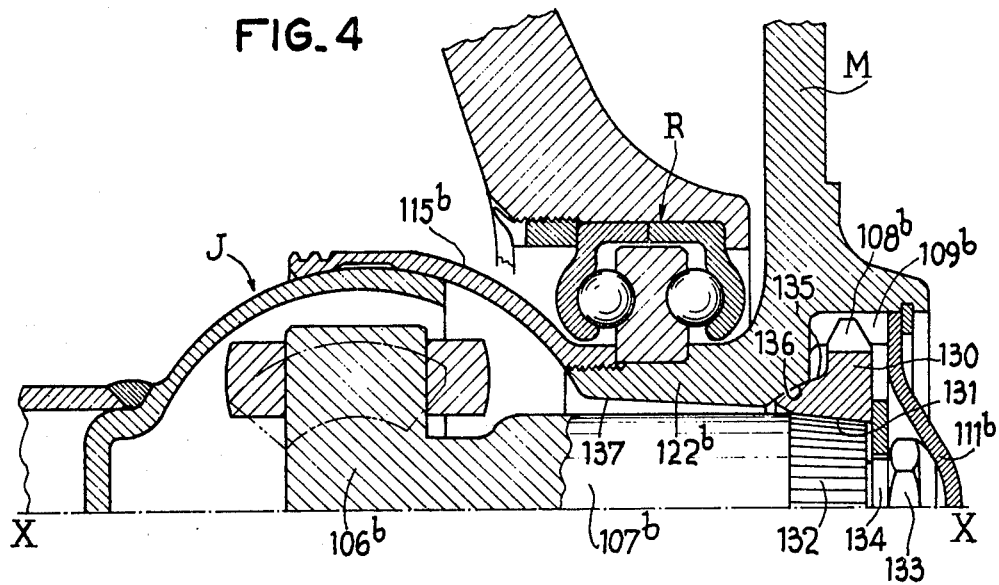

In the case of FIG. 4, the hub assembly is modified so as to permit a reduction in the diameter of the rolling bearing R. For this purpose, the teeth carried by the shaft section 107b rigid with the tripod element 106b is formed by a toothed wheel 130 which is capable of being disassembled owing to the provision of complementary part-conical splines 131, 132 carried by this wheel and an end portion of the shaft section, the axial connection being achieved by means of a nut 133 and a washer 134 which are disposed at the end of this shaft section. The toothed wheel 130 and the hub have two complementary part-spherical bearing surfaces 135, 136 in the same way as the nut 133 and the side wall 111b, whereas the axial cavity 137 of the hub in which the shaft section 107b extends has a frustoconical shape, these various arrangements being adapted to permit the angular movement due to the auxiliary joint constituted by the two teeth 108b, 109b and the axial positioning of the tripod.

As concerns the screwthreaded connection between the hub M and the member 115b forming a case, an arrangement similar to that described with reference to FIG. 2 is provided.

Note that the possible disassembly of the toothed wheel 130 in fact permits giving to the axial extension of the hub and consequently to the inner ring of the rolling bearing a smaller diameter while roughly the same advantages are obtained in other respects.

Figure 5:
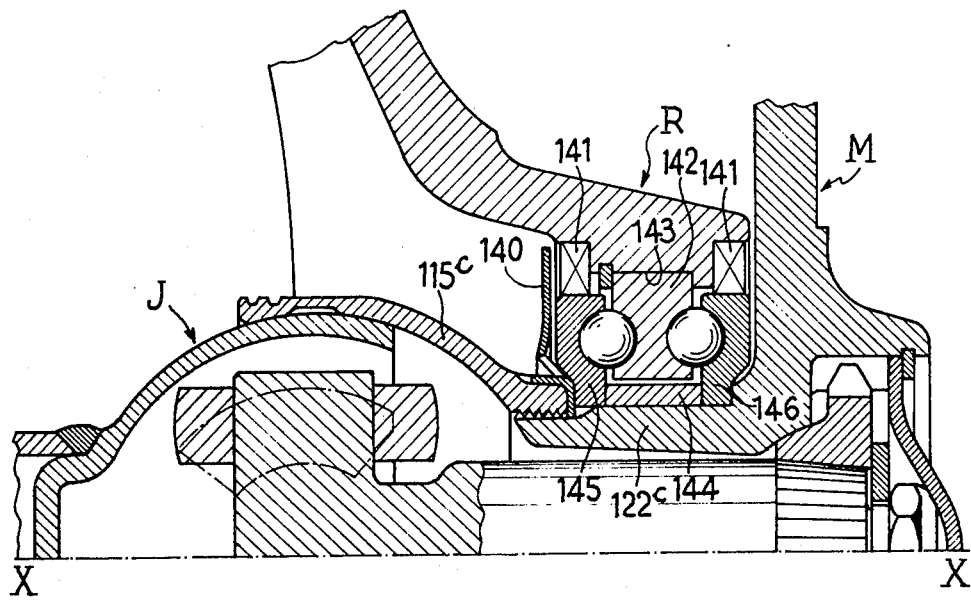

In the embodiment shown in FIG. 5, there are provided means for braking the screwthreaded connection between the lateral extension 122c of the hub and the member 115c forming a case. These means comprise a sheet metal collar 140 which also performs the function of a deflector for protecting the bearing. Sealing elements 141 seal the latter and its outer ring 142 is a press fit in a bore 143. A spacer member 144 ensures both the precise adjustment of the distance between the inner rings 145 and 146 and the transmission of the axial force for rendering the rolling bearing, the hub and the joint rigidly interconnected.

In FIG. 6, the assembly of the hub, the bearing and the joint is achieved as described with respect to FIG. 5. A modification concerns the construction of the auxiliary joint between the shaft section 107d rigid with the tripod element and the hub M. This joint is here elastically yieldable and formed by a tube 150 which is connected by conical splines and a nut 151 to the shaft 107d, the tube being provided radial vanes 152 embedded in a mass of an elastomer material 153 provided in radial recesses formed in a cavity 154 of the hub. The vanes and the recesses can for example be eight in number. The mass of elastomer extends axially beyond the vanes at 155 and 156 and is retained by a side wall 157 and thus ensures the axial positioning of the tripod element. Such an elastically yieldable joint has the advantage, by the shock absorbing effect, of isolating the hub of the wheel from torsional oscillations coming from the engine unit and transmitted through the joint J.

In the arrangement shown in FIG. 7, a very small axial overall size of the hub-bearing-joint assembly has been aimed at. For this purpose, the hub and the member forming a case are in one piece and the inner ring 125e is clamped between shoulder 128e and of the hub a nut 160 which cooperates with an outer screwthread 161. This reduction in the axial overall size of the assembly enables the distance between the centre O of the main joint and the axis Y—Y of the pivoting of the wheel to be increased so that the steering angle of the wheel can be increased for a given angular capacity of the homokinetic joint.

Figure 8:
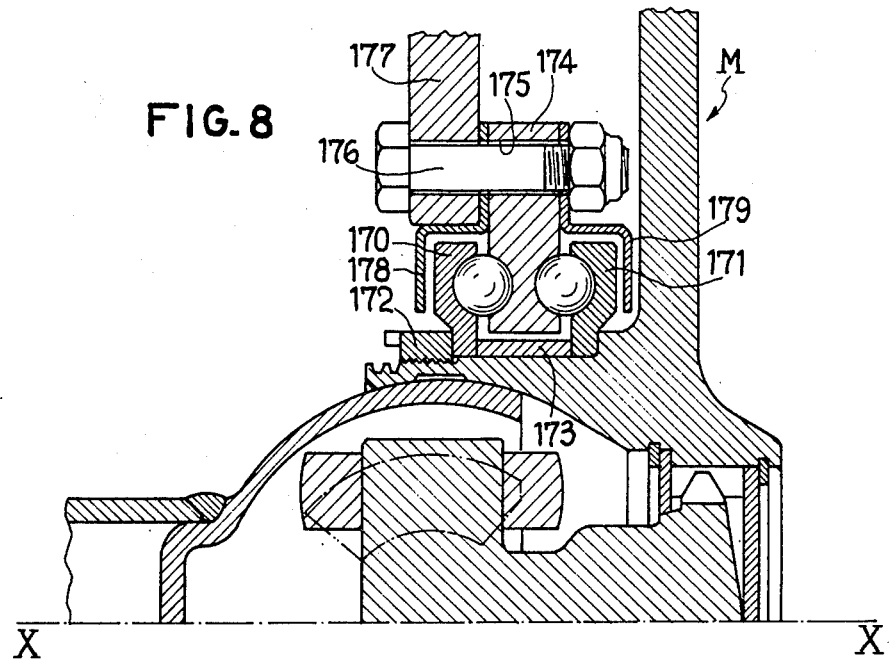

In FIG. 8, two inner rings 170, 171 are provided and are blocked as in the embodiment shown in FIG. 6 by a nut 172 and are separated by a spacer member 173. On the other hand, the outer ring 174 comprises apertures 175 which are provided for fixing it to a pivot carrying member 177 by bolts 176. Deflectors 178, 179 protect the rolling bearing and also serve to maintain the inner rings 170, 171 and the spacer member 173 assembled before general assembly.

Figure 9:
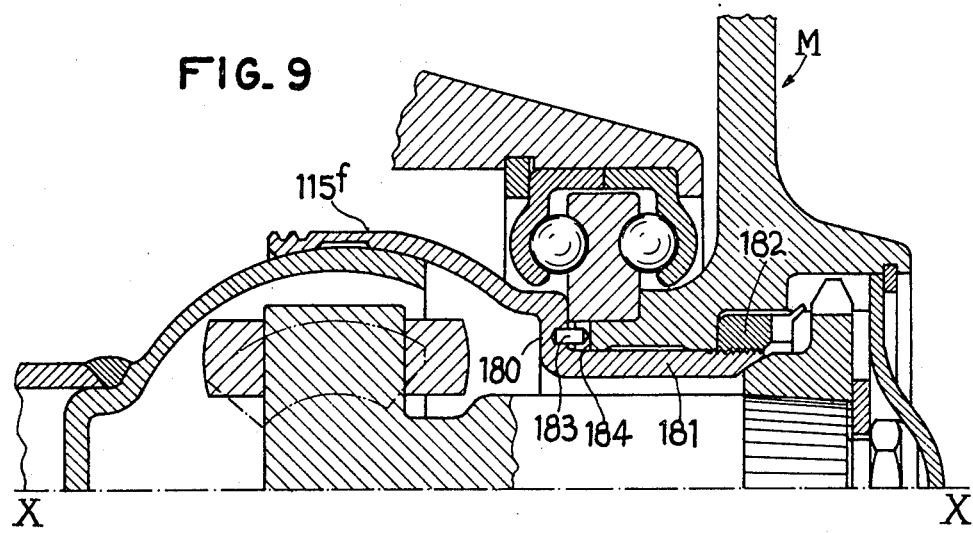

In the embodiment shown in FIG. 9, although the auxiliary joint is similar to that described with respect of FIG. 4, the mode of assembly is different. The case 115f of the joint comprises a radial step 180 and an axial tube 181 extending through the hub M. The end of this tube is screwthreaded and receives a crenelated nut 182 which is braked relative to the hub. A pin 183 inserted in the step or radial shoulder 180 and cooperating with a recess 184 in the hub prevents relative rotation between the case 115f and the hub and thereby facilitates the screwing of the nut 182.

It must be understood that the various partial arrangements contemplated in respect of these various embodiments may be associated in different combinations according to special applications without departing from the scope of the invention as defined in the appended claims.

Having now described my invention what I claim as new and desire to secure by Letters Patent is:

1. A structure for a wheel of a vehicle and comprising a hub for the wheel, a first homokinetic joint, a transmission shaft, a rolling bearing comprising first ring means and second ring means which are relatively rotatable, said second ring means providing means for fixing it to a hub supporting element of the vehicle which does not rotate with the transmission shaft, said first homokinetic joint comprising a tripod first element defining three trunnions, three part-spherical rollers respectively rotatively mounted on the trunnions, and a second element connected to rotate with the transmission shaft and defining three raceways in which raceways the rollers are respectively received, the first element being distinct from the hub, an auxiliary homokinetic coupling which interconnects the hub and the first element, a case which is rigid with the hub and defines a concave part-spherical bearing surface, means rigid with the second element and defining a convex part-spherical bearing surface which is complementary to and cooperates with the concave part-spherical bearing surface, and means axially fixing said first ring means of said rolling bearing between the hub and the case.

2. The structure claimed in claim 1, wherein the hub carries an end wall against which an end of the first element bears.

3. The structure claimed in claim 1, comprising means axially retaining the first element and carried by said case.

4. The structure claimed in claim 1, wherein said first ring means of the rolling bearing are inner ring means of the rolling bearing and are carried by said case.

5. A structure for a wheel of a vehicle and comprising a hub for the wheel, a first homokinetic joint, a transmission shaft, a rolling bearing comprising first ring means and second ring means which are relatively rotatable, said second ring means providing means for fixing it to a hub supporting element of the vehicle which does not rotate with the transmission shaft, said first homokinetic joint comprising a tripod first element defining three trunnions, three part-spherical rollers respectively rotatively mounted on the trunnions, and a second element connected to rotate with the transmission shaft and defining three raceways in which raceways the rollers are respectively received, the first element being distinct from the hub, an auxiliary homokinetic coupling which interconnects the hub and the first element, a case which defines a concave part-spherical bearing surface, means rigid with the second element and defining a convex part-spherical bearing surface which is complementary to and cooperates with the concave part-spherical bearing surface, and a single screwthreaded connecting means rigidly interconnecting the hub, the case and said first ring means and concentric with an axis of rotation of the hub relative to the second ring means of the rolling bearing.

6. The structure claimed in claim 5, comprising means defining a lateral extension on one of two elements consisting of the case and the hub and centered on the axis of rotation of the hub and defining an axial bearing surface and at least one radial shoulder which engages with said first ring means of the rolling bearing, said screwthreaded connecting means interconnecting the hub and the case.

7. The structure claimed in claim 6, wherein said axial bearing surface is defined by a lateral extension of the hub, there being two of said radial shoulder blocking said first ring means of the rolling bearing and provided respectively on the hub and the case, said screwthreaded connecting means directly interconnecting the lateral extension of the hub and said case.

8. The structure claimed in claim 6, wherein the lateral extension is provided mainly on the case.

9. The structure claimed in claim 8, comprising a washer axially retaining the first element and blocked between an end of the lateral extension of the case and said shoulder which is provided on the hub.

10. The structure claimed in claim 1 or 2, wherein the hub and the case are in one piece.

11. The structure claimed in claim 5, 6, 7, 8, or 9, wherein the screwthreaded connecting means comprises a nut which cooperates with a screwthread provided on one of two elements consisting of the hub and the case.

12. The structure claimed in claim 5, 6, 7, 8 or 9, wherein the first element has a shaft portion rigid therewith and the auxiliary homokinetic coupling comprises a toothed member, means detachably mounting the toothed member on an end part of the shaft portion and means defining teeth in an axial cavity of the hub, said teeth being complementary to and cooperative with the teeth of the toothed member.

13. The structure claimed in claim 12, comprising means axially retaining the first element and including a retaining wall carried by the hub, part-spherical bearing surfaces on the toothed member and an end part of the shaft portion and part-spherical bearing surfaces on the hub and the retaining wall and engaging the bearing surfaces on the toothed member and the end part of the shaft portion.

14. The structure claimed in claim 13, wherein the axial cavity of the hub has a frustoconical shape.

15. The structure claimed in claim 13, wherein the axial cavity of the hub has a frustoconical shape.

16. The structure claimed in claim 5, 6, 7, 8 or 9, comprising a shaft portion rigid with the first element, the auxiliary homokinetic coupling comprising a member which is fixed on the shaft portion and is provided with vanes, a mass of elastomer material defining recesses and provided in a cavity of the hub, and means for fixing the mass of elastomer material in the cavity of the hub, the vanes being engaged in the recesses.

17. The structure claimed in claim 16, wherein vanes are retained in the mass of elastomer material in a direction parallel to the axis of rotation of the hub so that the first element is axially retained relative to the hub.

* * * * *